United States Patent [19]

Cohn et al.

[11] Patent Number: 4,551,773
[45] Date of Patent: Nov. 5, 1985

[54] ENCODING AND DECODING APPARATUS AND METHOD UTILIZING HIERARCHICAL CODE SUBSTITUTION

[75] Inventors: Martin Cohn, Arlington, Mass.; George V. Jacoby, Los Altos; Jorgen P. Vinding, Monte Sereno, both of Calif.

[73] Assignee: Sperry Corporation, New York, N.Y.

[21] Appl. No.: 398,744

[22] Filed: Jul. 16, 1982

[51] Int. Cl.$^4$ ............................................. G11B 5/09
[52] U.S. Cl. ........................................ 360/40; 360/48
[58] Field of Search .............................. 360/39, 40, 48

[56] References Cited

U.S. PATENT DOCUMENTS

| | | | |
|---|---|---|---|
| 4,387,364 | 6/1983 | Shirota | 360/40 |
| 4,482,927 | 11/1984 | Melbye et al. | 360/40 |

OTHER PUBLICATIONS

"Translator for Run Length Limited Code"—M. Meissler, IBM TDB vol. 17 #5 10/74.

*Primary Examiner*—Vincent P. Canney
*Attorney, Agent, or Firm*—Howard P. Terry; Albert B. Cooper

[57] ABSTRACT

A ternary magnetic recording system wherein groups of binary input digits are transformed into corresponding groups of ternary recording code symbols utilizing a hierarchical code substitution system in which the longest valid group in the code is encoded. The code substitution system provides retention of the advantageous properties of a prior ternary recording system while significantly enhancing the automatic gain control utilized in amplitude discrimination between two of the ternary recording symbols. Anomalous detection of chained doublets is also obviated. Data recovery is effected by decoding apparatus utilizing an eight bit addressable ROM addressed with a twelve bit ternary word.

37 Claims, 9 Drawing Figures

SINGLE WORDS

| NO. | BINARY | ALPHA | TERNARY | HEXADECIMAL ADDRESS |
|---|---|---|---|---|
|  | – – | Z | 000 | – – |
| 1 | 00 | g | 100 | 80–9F |
| 2 | 01 | G | 200 (110) | C0–DF |
| 3 | 10 | h | 010 | 40–5F |
| 4 | 11 | H | 020 (011) | 60–7F |
|  | – – | k | 001 | – – |
|  | – – | K | 002 (0011) | – – |

DOUBLE GROUPS

| NO. | ORIGINAL | SUBSTITUTION | HEXADECIMAL ADDRESS |
|---|---|---|---|
| 5 | GG | GZ | C0–C3 |
| 6 | hg | kZ | 20–23 |
| 7 | hG | hZ | 40–43 |
| 8 | Hg | HZ | 60–63 |
| 9 | HG | KZ | 30–33 |
| 10 | HH | gZ | 80–83 |

TRIPLE GROUPS

| NO. | ORIGINAL | SUBSTITUTION | HEXADECIMAL ADDRESS |
|---|---|---|---|
| 11 | hHH | kkZ | 24–25 |
| 12 | HGG | KkZ | 34–35 |
| 13 | HGH | kkZ | 26–27 |

QUADRUPLE GROUPS

| NO. | ORIGINAL | SUBSTITUTION | HEXADECIMAL ADDRESS |
|---|---|---|---|
| 14 | Hg GG | KkkZ | 34 |
| 15 | Hg GH | kKkZ | 26 |
| 16 | HG HG | kkkZ | 24 |
| 17 | GG GG | kZZg | 21 |
| 18 | Hg Hg | KZZg | 31 |
| 19 | GHgH | kZZg | 41 |

FIG. 1.

| CODE TABLE |||||||||||||||||||||
|---|---|---|---|---|---|---|---|---|---|---|---|---|---|---|---|---|---|---|---|---|
| NO. | B1 | B2 | B3 | B4 | B5 | B6 | B7 | B8 | R1 | R2 | R3 | R4 | R5 | R6 | R7 | R8 | R9 | R10 | R11 | R12 |
| 1 | 0 | 0 |  |  |  |  |  |  | 1 | 0 | 0 |  |  |  |  |  |  |  |  |  |
| 2 | 0 | 1 |  |  |  |  |  |  | 1 | 1 | 0 |  |  |  |  |  |  |  |  |  |
| 3 | 1 | 0 |  |  |  |  |  |  | 0 | 1 | 0 |  |  |  |  |  |  |  |  |  |
| 4 | 1 | 1 |  |  |  |  |  |  | 0 | 1 | 1 |  |  |  |  |  |  |  |  |  |
| 5 | 0 | 1 | 0 | 1 |  |  |  |  | 1 | 1 | 0 | 0 | 0 | 0 |  |  |  |  |  |
| 6 | 1 | 0 | 0 | 0 |  |  |  |  | 0 | 0 | 1 | 0 | 0 | 0 |  |  |  |  |  |
| 7 | 1 | 0 | 0 | 1 |  |  |  |  | 0 | 1 | 0 | 0 | 0 | 0 |  |  |  |  |  |
| 8 | 1 | 1 | 0 | 0 |  |  |  |  | 0 | 1 | 1 | 0 | 0 | 0 |  |  |  |  |  |
| 9 | 1 | 1 | 0 | 1 |  |  |  |  | 0 | 0 | 1 | 1 | 0 | 0 |  |  |  |  |  |
| 10 | 1 | 1 | 1 | 1 |  |  |  |  | 1 | 0 | 0 | 0 | 0 | 0 |  |  |  |  |  |
| 11 | 1 | 0 | 1 | 1 | 1 | 1 |  |  | 0 | 0 | 1 | 0 | 0 | 1 | 0 | 0 | 0 |  |  |
| 12 | 1 | 1 | 0 | 1 | 0 | 1 |  |  | 0 | 0 | 1 | 1 | 0 | 1 | 0 | 0 | 0 |  |  |
| 13 | 1 | 1 | 0 | 1 | 1 | 1 |  |  | 0 | 0 | 1 | 0 | 0 | 1 | 1 | 0 | 0 |  |  |
| 14 | 1 | 1 | 0 | 0 | 0 | 1 | 0 | 1 | 0 | 0 | 1 | 1 | 0 | 1 | 0 | 0 | 1 | 0 | 0 | 0 |
| 15 | 1 | 1 | 0 | 0 | 0 | 1 | 1 | 1 | 0 | 0 | 1 | 0 | 0 | 1 | 1 | 0 | 1 | 0 | 0 | 0 |
| 16 | 1 | 1 | 0 | 1 | 1 | 1 | 0 | 1 | 0 | 0 | 1 | 0 | 0 | 1 | 0 | 0 | 1 | 0 | 0 | 0 |
| 17 | 0 | 1 | 0 | 1 | 0 | 1 | 0 | 1 | 0 | 0 | 1 | 0 | 0 | 0 | 0 | 0 | 0 | 1 | 0 | 0 |
| 18 | 1 | 1 | 0 | 0 | 1 | 1 | 0 | 0 | 0 | 0 | 1 | 1 | 0 | 0 | 0 | 0 | 0 | 1 | 0 | 0 |
| 19 | 0 | 1 | 1 | 1 | 0 | 0 | 1 | 1 | 0 | 1 | 0 | 0 | 0 | 0 | 0 | 0 | 0 | 1 | 0 | 0 |

ENCODING AND DECODING APPARATUS AND METHOD UTILIZING HIERARCHICAL CODE SUBSTITUTION

BACKGROUND OF THE INVENTION

1. Field of the Invention

The invention relates to magnetic recording and recovery systems and particularly to ternary magnetic recording systems. The invention is also applicable to digital data communication systems.

2. Description of the Prior Art

Digital magnetic recording systems, such as discs, tape, drums and the like, are in wide spread usage wherein digital data is stored by means of recording flux transitions from one magnetic state of the medium to another. In typical binary systems, a binary 1 is denoted by the presence of a flux transition and a binary 0 is denoted by the absence of a transition. Traditionally, the transitions are effected between the two states of magnetic saturation viz: positive saturation and negative saturation.

It has been a continuing desideratum in such systems to increase the density of the data stored on the medium. It is well known, however, that when flux transitions are stored too close together on the medium intersymbol interference results severely distorting the recovered data. Additionally, since the data recovery system is timed by a clock signal derived from the recorded transitions, long runs of binary 0's which do not result in transitions cause the timing clock to drift resulting in anomalous behavior of the system.

These problems have been significantly reduced by the use of recording codes that translate the binary input data into suitable codes which are then recorded on the medium. Constraints are placed on the code with respect to minimum and maximum spacings between transitions so as to reduce intersymbol interference and provide a stable recovery clock while effecting the highest possible data storage density. A detailed discussion of these problems as well as the properties of a number of magnetic recording codes may be found in U.S. Pat. No. 4,323,931 issued Apr. 6, 1982 to George V. Jacoby entitled "Method and Apparatus for Encoding and Recovering Binary Digital Data", and assigned to the present assignee.

A significant improvement in data storage density was effected by the ternary system disclosed in U.S. patent application Ser. No. 260,248, filed May 5, 1981 in the names of George V. Jacoby and Martin Cohn entitled "Ternary Data Encoding System" and assigned to the present assignee. The system of said Ser. No. 260,248 utilized two recording levels, preferably positive and negative magnetic saturation and transitions between the levels to record binary data in a ternary format. The binary data was encoded into a ternary code wherein a ternary 1 code symbol was recorded as a first kind of signal change between magnetic levels, a ternary 2 code symbol as a second kind of signal change between the magnetic levels and ternary 0 by the absence of a signal change between the levels. Preferably, the first kind of signal change was a single transition between the levels denoted as a "singlet". The second kind of signal change was preferably two closely spaced transitions forming a pulse or "doublet". Thus, the preferred embodiment of said Ser. No. 260,248 was based on representing the ternary code symbols 0, 1 and 2 by nulls, singlets and doublets, respectively.

The ternary system of said Ser. No. 260,248 utilized a ternary variation of the recording code disclosed in said U.S. Pat. No. 4,323,931 providing numerous desirable properties with respect to minimum and maximum spacings between ternary symbols, data storage density, code rate and detection window. Said Ser. No. 260,248 disclosed two ternary, fixed length, recording codes, one code converting groups of two binary digits into code groups of three ternary symbols and an alternative code converting groups of four binary digits into code groups comprising six ternary symbols. The system of said Ser. No. 260,248 utilized look ahead principles to effect merging, skipping or shifting so as to achieve the desirable code constraints. The ternary system of said Ser. No. 260,248 is further described in the IEEE Transactions on Magnetics, Volume MAG-17, No. 6, November 1981 in an article on page 3326 entitled "Ternary 3PM Magnetic Recording Code and System" by George V. Jacoby.

The ternary code of said Ser. No. 260,248 that converts four binary digits into six ternary code symbols has the following constraints. All non-zero symbols are separated by a maximum of eight detents or seven zeroes. Ternary 1's are separated by a minimum of three detents or two zeroes and ternary 1's followed by ternary 2's and ternary 2's followed by ternary 1's are also separated by a minimum of three detents or two zeroes. Additionally, consecutive ternary 2's are separated by a minimum of four detents or three zeroes. The term detent refers to a single timing clock interval as discussed in said Ser. No. 260,248 or said U.S. Pat. No. 4,323,931.

Detection techniques for discriminating between recorded singlets and recorded doublets are discussed in said Ser. No. 260,248 as well as in said article by George V. Jacoby entitled "Ternary 3PM Magnetic Recording Code and System". In order to provide robust recovery discrimination between singlets and doublets, it is desirable to use an amplitude discrimination characteristic as well as zero crossing and peak detection criteria. Amplitude may be utilized for this purpose since, all other factors being equal, the amplitude of a recovered singlet is significantly greater than the amplitude of a recovered doublet. Amplitude, however, is an unreliable discrimination criterion because of the large gain variations normally encountered in such magnetic recording systems. For example, the gain of the system changes as the flying height of the read head varies and also is dependent upon characteristics of the medium such as thickness. Instability in the electronic circuitry may also contribute to the unreliability. Automatic gain control (AGC) circuitry may be utilized to stabilize the gain of the system where the AGC would sense the extant amplitudes of either the recovered singlets or the recovered doublets. It was noted in the recording codes of said Ser. No. 260,248 that the distance between singlets and the distance between doublets was unbounded. Thus, an AGC system responsive to either detected singlets or detected doublets may tend to drift in the absence of the appropriate recorded symbols. It was also noted that with respect to sequences of chained doublets, i.e., three or more doublets, each separated from the adjacent doublets by three zeroes, an error in detection would propagate through the entire chain.

It was desirable in the development of the present invention to utilize the detected singlets for AGC amplitude control since recovered singlets may be utilized more reliably for this purpose than recovered doublets. It would therefore be necessary to limit the run of a finite value between recorded singlets. It was also desirable to impose a constraint on the code so as to eliminate the possibility of error propagation caused by chained doublets.

It would be exceedingly difficult, if not impossible, to impose these two constraints on the code and preserve all of the other desirable properties of the prior code disclosed in said Ser. No. 260,248 and in said article by George V. Jacoby utilizing the conventional fixed length look ahead code format or a conventional variable length code format.

SUMMARY OF THE INVENTION

The present invention comprises a ternary magnetic recording and reproducing system that preserves all of the desirable characteristics of the system of said Ser. No. 260,248 and imposes the additional constraints discussed above by utilizing a hierarchical code substitution system that encodes the data input word that matches the longest word in the substitution encoding tables. The invention may be viewed as the utilization of a variable length recording code which is also a look ahead code. The hierarchical code substitution system limits the number of recording positions between recorded singlets to a finite number so as to provide reliable automatic gain control for amplitude discrimination between singlets and doublets. The hierarchical code substitution system also eliminates the error propagation deficiency of the prior ternary code system of said Ser. No. 260,248. The decoder of the present invention utilizes a unique decode lookup memory arrangement wherein the length of the word to be decoded is longer than the address input of the lookup memory.

DESCRIPTION OF THE PREFERRED EMBODIMENT

Figure 1:
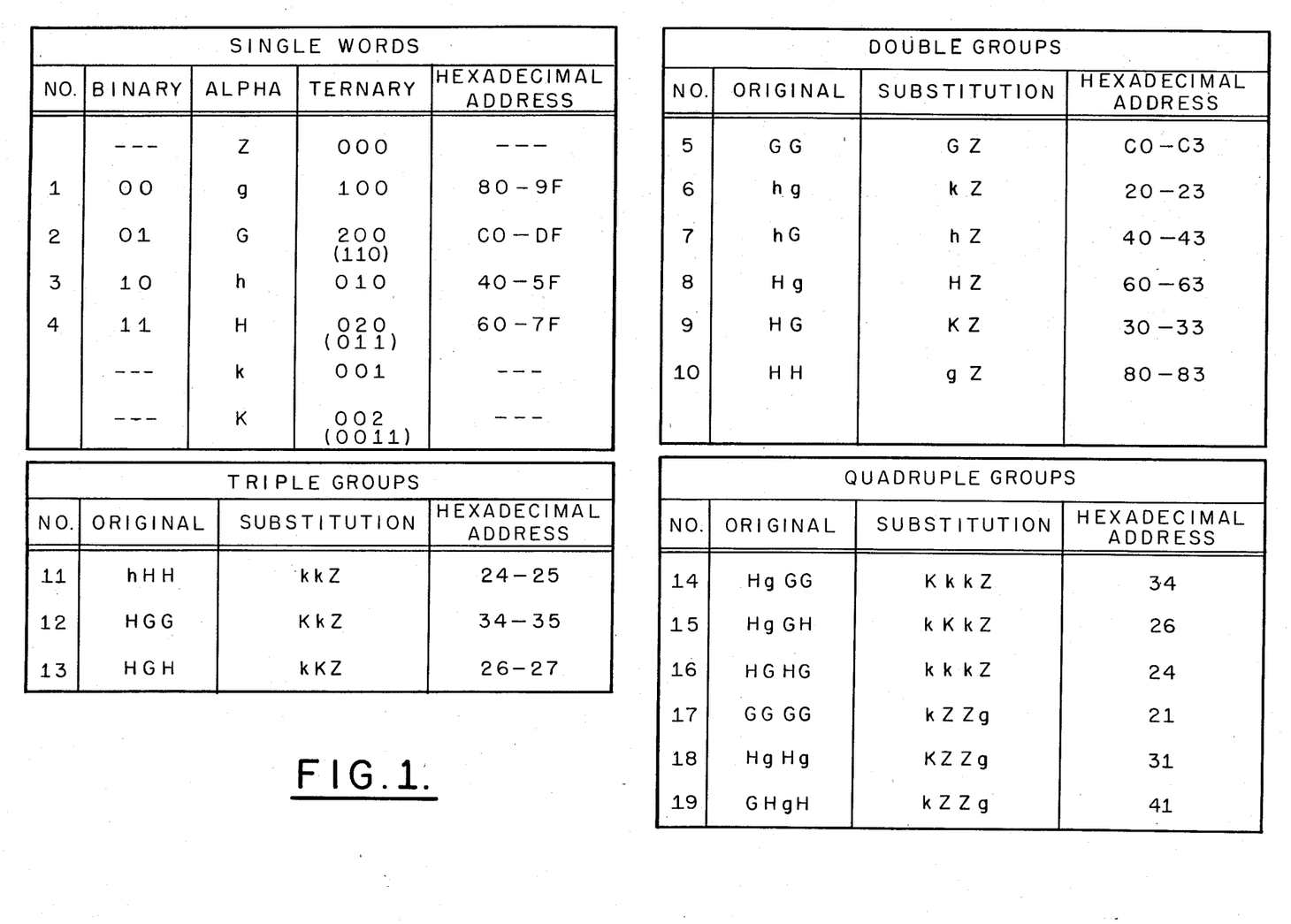
FIG. 1 is a code table depicting the variable length code and hierarchical code substitutions of the present invention in an alphabetical notation and including corresponding hexadecimal addresses utilized in decoding.

Referring to FIG. 1, a table depicting the code utilized in the present invention is provided. The section of the table designated as single words denotes the basic units of the code which are the four possible two bit binary words. Each of the single words is named with an alphabetical character for convenience as illustrated. Each single word is associated with a ternary code word comprising two ternary zeroes and one non-zero ternary symbol. The remaining three possible ternary code words of three symbols containing at most one non-zero symbol are also illustrated and provided with alphabetical names as illustrated. In the code ternary symbols, 0, 1, and 2 are utilized which are recorded as nulls, singlets, and doublets, respectively, in a manner to be described. For convenience in the implementation of the present embodiment, ternary 2 is denoted by two consecutive 1's where the first of the 1's occurs at the position of the ternary 2. This nomenclature and implementation may be utilized since in the present code a 0 always follows a 2. The two consecutive 1's designation for the ternary 2 symbol is indicated in parentheses in the single word section of FIG. 1. A hexadecimal address is illustrated associated with each of the single words, which address is utilized in the decoding portion of the present invention in a manner to be explained.

As discussed above, it is a desideratum of the present invention to retain all of the desirable code constraints and properties of the prior codes while imposing further stringent constraints. One of the additional constraints is that adjacent ternary 1's are separated by no more than twenty-six detents. This is to provide a reliable AGC control for the amplitude discrimination between doublets and singlets. The second additional constraint is that the spacings between three adjacent ternary 2's be at a minimum, four detents and five detents, or five detents and four detents. This is to interrupt the regularity of chained doublets which can result in excessive error propagation, as discussed above. It is appreciated that the herein specified spacings may be in terms of recording detents (clocked recording positions) or in terms of runs of 0's. A spacing in terms of intermediate 0's is one less than the spacing in terms of detents.

Where the concatenation of ternary code words would result in a violation of one of the desired constraints as discussed above, substitution code groups are provided. The double word groups illustrated in FIG. 1 provide substitutions for the concatenations of two single words that would result in a constraint violation. The triple word groups and quadruple word group illustrated in FIG. 1 provide further substitutions to avoid violation of any of the desired code constraints. It is noted that all of the double word and triple word substitutions as well as three of the six quadruple word substitutions end in the single word Z. As indicated in the single word portion of FIG. 1, Z is the name for the ternary code word comprising three ternary 0's. It is further noted that the last three quadruple word groups end in Z Z g. With these code group endings, no concatenation of any combination of code groups will result in a violation of any of the code constraints discussed above and the occurrence of a substitution is rendered unambiguous.

It is appreciated that the alphabetical names given to the ternary code words are arbitrarily chosen and are utilized for convenience. With respect to the single words, the assignment of binry words to ternary words is arbitrary, other assignments being usable within the purview of the present invention. Similarly, the double word, triple word and quadruple word substitutions illustrated in FIG. 1 are to an extent arbitrary, other substitutions being usable in achieving all of the code constraints and code properties discussed above. Each group is provided with a designation number to facilitate discussion thereof hereinbelow.

The specific motivations for the various substitutions are as follows. With respect to the double word substitutions, substitution number 5 prevents the violation 2 0 0,2. Substitution number 6 prevents the violation 1 0,1. Substitution 7 prevents the violation 1 0,2. Substitution number 8 prevents the violation 2 0,1. Substitution number 9 prevents the violation 2 0,2 and substitution number 10 prevents the violation 2 0,0 2. Thus, it is appreciated that these double word substitutions correct potential violations of minimum spacing rules.

With respect to the triple word substitutions, substitution number 11 prevents the double word substitution number 10 from forming hg. The triple word substitution 12 prevents the double word substitution 9 from forming the KZG(K) (chained doublets). The triple word substitution 13 prevents the double word substitution 9 from forming KZH. The triple word substitutions 12 and 13 also inhibit the beginning of runs of doublets. Without these rules, HgHg or HGGH, repeated indefinitely, would have no singlets.

With respect to quadruple word substitutions, substitution number 14 prevents the potential of a doublet run. Substitution number 15 prevents the potential of a doublet chain. Substitutions 16–19 prevent the potentials of doublet runs. The term chain refers to three or more doublets at a minimum spacing of four detents, i.e., 2 0 0 0 2 0 0 0 2 . . . and the term run here refers to doublets without an intervening singlet.

Figure 2:
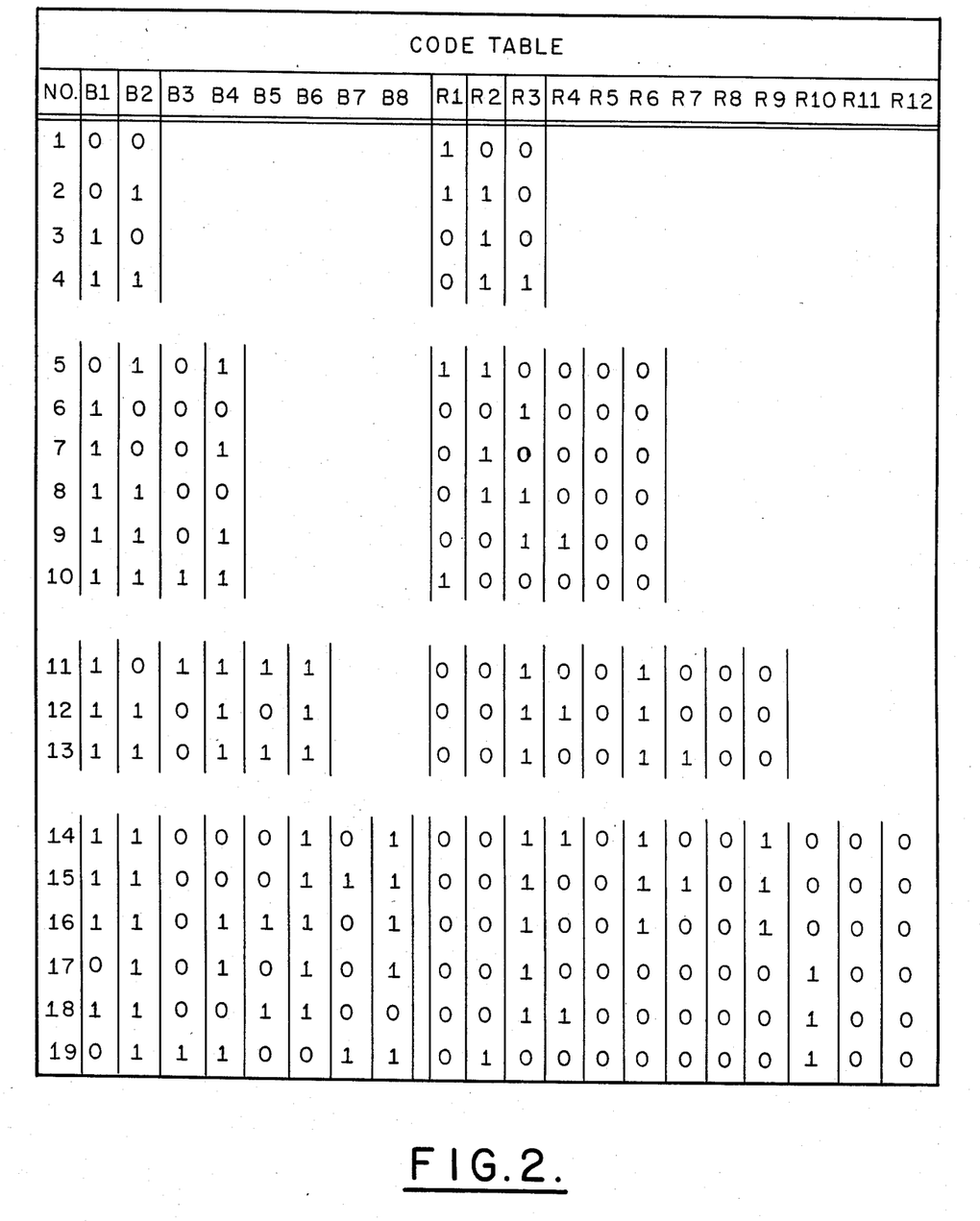
FIG. 2 is a code table illustrating the variable length code with the hierarchical substitutions of the present invention in binary notation format.

Referring to FIG. 2, the code table of FIG. 1 is rewritten with all of the binary input groups on the lefthand side of the table, the bits of which being designated as B1–B8 and the corresponding ternary code groups on the righthand side of the table with the digits thereof designated as R1–R12. It is appreciated that groups numbered 1 through 4 are the single words; the groups numbered 5 through 10 are the double word substitutions; the groups numbered 11 through 13 are the triple word substitutions and the groups numbered 14 through 19 are the quadruple word substitutions. With respect to the righthand side of the table, ternary 0 is again represented as a 0, ternary 1 as a 1, and ternary 2 as a double 1 with the left most 1 in the position of the ternary digit.

With continued reference to FIGS. 1 and 2, in the operation of the preferred embodiment of the present invention, eight binary input digits are examined and the longest match in the table is encoded. If the longest match is a quadruple word group, (groups 14–19 of FIG. 2) the binary input string of eight bits is encoded into the corresponding twelve ternary digits and the next eight binary input bits are examined. If, however, the longest match in the table is a triple word group, i.e., only the first six bits of the eight binary bits being examined match a group in the table (groupls 11–13 of FIG. 2), then the appropriate nine digit ternary triple word is used as the encoding. The next six binary input bits are then brought in and the process repeated on the new group of eight binary bits.

In a similar manner, if the longest match is with a double word group or a single word group, the appropriate ternary encoding is utilized and the appropriate number of new binary input bits are inputted for the next iteration.

Figure 3:
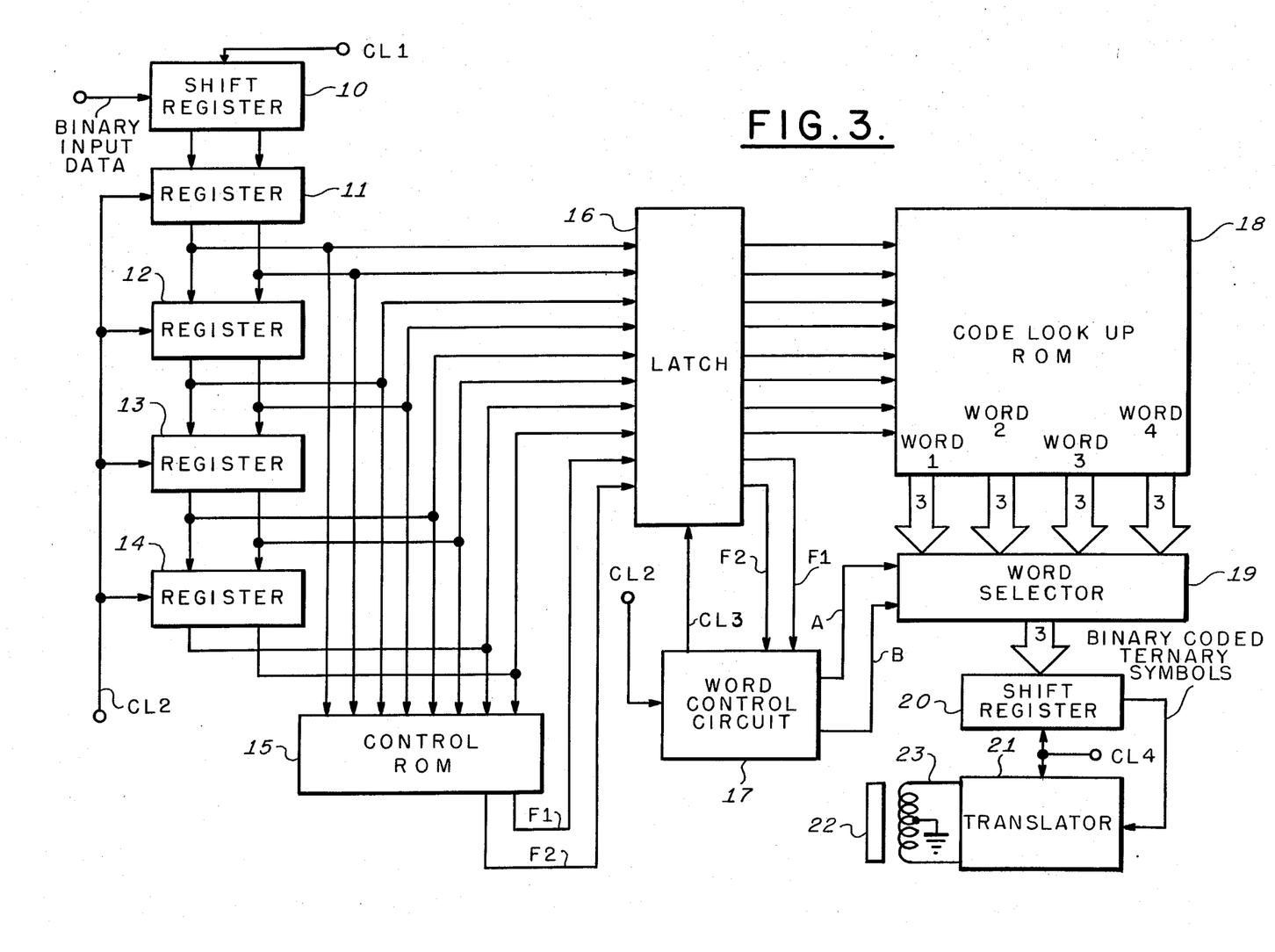
FIG. 3 is a schematic block diagram of the recording portion of the present invention including the encoder thereof.
Figure 4:
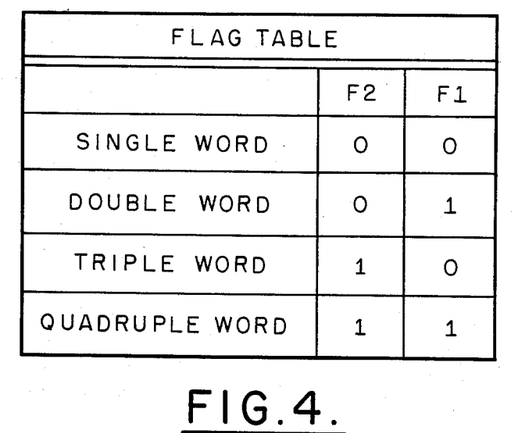
FIG. 4 is a table of flag values utilized in the encoder of FIG. 3 and the decoder of FIG. 7.
Figure 5:
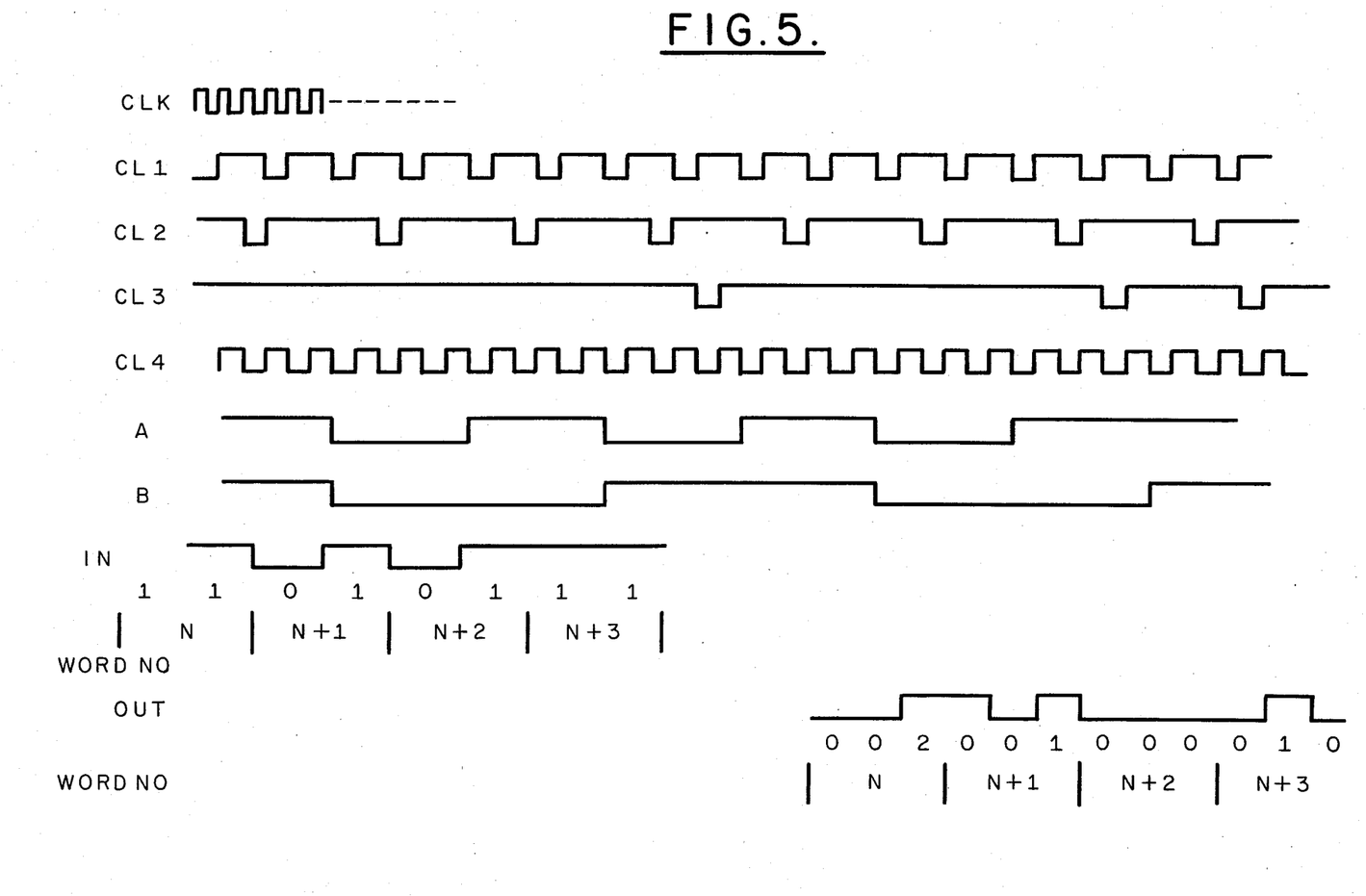
FIG. 5 is a waveform timing diagram illustrating waveforms related to the operation of the encoder of FIG. 3.

Referring now to FIGS. 3, 4 and 5, FIG. 3 illustrates the recording portion of the system of the present invention, including the encoder thereof; FIG. 4 illustrates a flag table utilized in the encoder of the FIG. 3, and FIG. 5 illustrates timing waveforms utilized in the recording apparatus of FIG. 3. For the purposes of the ending discussion and by way of example, it will be assumed that the present invention is embodied in a magnetic disc storage system. It is appreciated that the invention is applicable to other magnetic storage systems such as tapes and drums, as well as to data communication systems.

The apparatus of FIG. 3 is timed by a phase locked oscillator (not shown) that is synchronzied to the speed of disc rotation in a conventional manner. The phase locked oscillator provides a basic clock signal referred to as CLK (FIG. 5) from which the other timing signals utilized in the recording portion of the system are derived.

Referring to FIG. 3, the stream of binary input data is applied to a two stage serial-in parallel-out shift register 10 that shifts the input bits to the right in response to the binary bit clock signal CL1. The CL1 signal is illustrated in FIG. 5. The shift register 10 forms the input data words comprising two binary bits in the embodiment illustrated in FIG. 3. Thus, the shift register 10 converts the serial input data into parallel data words of two bits each. The parallel output of the shift register 10 is applied to a two stage parallel-in parallel-out register 11 clocked by the binary word clock CL2 which is illustrated in FIG. 5. The Parallel output of the register 11 is coupled to the parallel input of a further two stage parallel-in parallel-out register 12, the output of which is coupled as the input to a third parallel-in parallel-out register 13 which is further coupled to a fourth parallel-in parallel-out register 14. All of the registers 11–14 are strobed by the word clock CL2. The registers 10–14 may be commercially procurable multipurpose registers controlled to provide the functions described or alternatively the registers 11–14 may be two stage latches or buffers. The CL1 bit clock continually shifts the binary input data through the register 10 while the word clock CL2 propagates successive two bit binary input words through the sequence of registers 11–14. It is thus appreciated that the outputs of the registers 11–14 provide the eight most recent binary input bits which comprise the four most recent two bit input words.

The serial stream of binary input data may alternatively be converted into parallel groups of the eight most recently occurring bits by utilizing an eight stage serial-in parallel-out shift register with an eight stage buffer. The arrangement of FIG. 3 is, however, preferable in that subsequent operations to be performed may utilize two bit times for execution whereas the alternative arrangement provides only one bit time in which to perform the operations. It is appreciated in the herein disclosed embodiment of the present invention that the binary word clock CL2 is at one-half the frequency of the binary bit clock CL1.

The parallel outputs from the registers 11–14 are applied as an eight bit input to a control circuit 15 which is preferably embodied as a control ROM utilizing the eight bit input as the addressing signal therefor.

The control ROM 15 is a 256 word memory two bits wide. The control ROM 15 is utilized to determine whether the current eight binary input bits contain one, two, three or four, two bit words in the code table illustrated in FIGS. 1 and 2. The control ROM 15 in response to the eight bit input address provides flag signals F2 and F1 as indicated in the flag table of FIG. 4. The ROM 15 is loaded in a conventional manner to perform this function by inserting the appropriate flags in each of the 256 words of the ROM in accordance with the eight bit addresses delineated on the lefthand side of the table of FIG. 2. For example, the six, two bit words of the ROM 15 addressed by the eight bit combinations of lines 14–19 of the left-hand side of FIG. 2, will have the flags 1 1 loaded into these locations. In a similar manner the flags 1 0 are loaded into those words of the ROM 15 that are addressed by the triple word groups 11–13 of the lefthand side of FIG. 2. In this instance, it is appreciated that each of these six bit addresses will address a plurality of locations in the control ROM 15, each of which will store the triple word flags 1 0, except for those locations that are otherwise addressed by one of the quadruple words 14–19 of the lefthand side of FIG. 2. Similarly, the remainder of the ROM 15 is loaded with the single word and double word flags in accordance with the single word and double word addresses delineated on the lefthand side of FIG. 2.

It is, therefore, appreciated that the control ROM 15 provides the flag signals F2 and F1 indicative of whether the current eight bits of the binary input data contain one, two, three, or four valid input words.

The current eight binary input bits from the registers 11–14, as well as the control flag signals F2 and F1 from the control ROM 15, are applied as the inputs to a latch 16. The latch 16 is strobed by a clock CL3 from a word control circuit 17. The CL3 clock signal is illustrated in FIG. 5. The latch 16 provides the eight binary input bits and the flag signals stored therein at its output until strobed by the CL3 clock at which time the data stored in the latch 16 is replaced by new data extant at the input of the latch.

The word control circuit 17 includes a word counter (not shown) which comprises a two stage binary counter coupled to count the word clock pulses CL2. The two bit parallel binary output of the word counter is provided as word selector signals A and B, for reasons to be discussed. The word control circuit 17 also includes a two bit comparator (not shown) that compares the output of the word counter with the flag signals F2 and F1 and provides the CL3 clock when the output of the word counter matches the flag signals. Thus, it is appreciated that the word control circuit 17 provides the CL3 clock signal whenever the word counter has counted the occurrence of one, two, three, or four binary input words in accordance with the word count instruction provided by the F2 and F1 signals from the latch 16. The word selector control signals A and B from the word control circuit 17 are illustrated in FIG. 5.

The eight binary inputs bits stored in the latch 16 are utilized to address a ROM 18 which stores the code lookup table of FIG. 2. The ROM 18 comprises a memory containing 256, twelve bit words. The words addressed by the eight bits of lines 14–19 of the lefthand side of FIG. 2 contain the respective corresponding twelve digits illustrated on the righthand side of FIG. 2. Thus when the eight current input bits represent a quadruple word group, the corresponding twelve digit ternary encoding is provided at the output of the ROM 18. In a similar manner, the triple, double, and single word groups of the lefthand side of FIG. 2 address the ROM 18 to provide the corresponding ternary encoding digits illustrated in the right hand side of FIG. 2. The output of the ROM 18 is denoted as word 1, word 2, word 3 and word 4 corresponding to the three digit ternary words into which the two bit binary input words are encoded. It is appreciated from the code table of FIG. 2 that digits R5, R8, R11 and R12 are always logic 0. These digits may alternatively be hardwired to a logic 0 signal source.

The twelve bit output of the ROM 18 is applied to a word selector switch 19 which receives the word selector control signals A and B from the word control circuit 17. The word selector switch 19 sequentially provides the words 1, 2, 3, and 4 from the ROM 18 to the three digit output of the word selector switch 19 in response to the word selector control signals A and B. In a manner to be described, the word selector 19 provides a variable number of three digit words in accordance with the instruction provided by the flag signals F2 and F1.

The three digit output of the word selector 19 is applied as the parallel input to a parallel-in serial-out shift register 20 which is clocked by a ternary digit clock CL4. The ternary digit clock CL4 is illustrated in FIG. 5. The output of the shift register 20 provides the serial binary coded digits of the ternary output code. The ternary digit clock CL4 has a rate of 3/2 the rate of the binary input bit clock CL1. Thus, the shift register 20 transmits three ternary code digits in the same time that the input shift register 10 receives two binary data bits.

The elements 10–20 of FIG. 3 comprise the encoder of the present invention. In operation, the word counter within the word control circuit 17 counts the binary word clock pulses CL2 and provides sequential control signals A and B which control the word selector 19 to sequentially provide the three digit ternary words appearing at the output of the ROM 18. The flag signals F2 and F1 indicate whether one, two, three or four, two bit input words are to be encoded. When the output of the word counter (which provides the signals A and B) attains the value of the flags F2 and F1, the comparator within the word control circuit 17 issues the CL3 signal which strobes the current eight input bits into the latch 16 and recycles the word selector 19 back to word 1. Thus it is appreciated that when the encoding of a variable length group of data words is completed, the word control circuit 17 issues the CL3 signal to strobe the most recent eight data bits as well as the corresponding flag values into the latch 16. In this manner, the input data stream is encoded in accordance with the variable length code of the present invention as illustrated in FIGS. 1 and 2 and in accordance with the longest match to the words on the lefthand side of FIG. 2.

The ternary output code from the shift register 20 is applied as an input to a translator 21 which is timed by the ternary digit clock CL4 which is also utilized to define the recording detents. The translator 21 translates the ternary digits into three distinct magnetic recording phenomena which are recorded on the magnetic medium 22 via a write head 23. In the preferred embodiment of the invention, the ternary 1 symbol is recorded as a singlet and the ternary 2 symbol is recorded as a doublet while the ternary 0 signal is recored as the absence of a transition denoted as a null. As discussed above, the ternary 2 symbol is depicted as two consecutive 1's. The translator 21 writes the singlets at a detent and writes a doublet one detent wide centered at a detent. The translator 21 delays the stream of ternary code digits and in response to detecting single 1's and double 1's, delays the single 1's by one-half detent more than the double 1's. By conventional circuitry, the translator 21 writes a flux reversal for each of the received 1's. The flux reversal preferably is effected by a flux transition from magnetic saturation of one polarity to magnetic saturation of the opposite polarity. It is thus appreciated that in response to the ternary 1's, a singlet is recorded at a detent and in response to the double 1's representing a ternary 2, a doublet is recorded centered at a detent. In response to a ternary 0, no flux transition is effected.

A typical data sequence wherein two bit binary input words are encoded into three digit ternary output code words is illustrated in FIG. 5.

Figure 6:
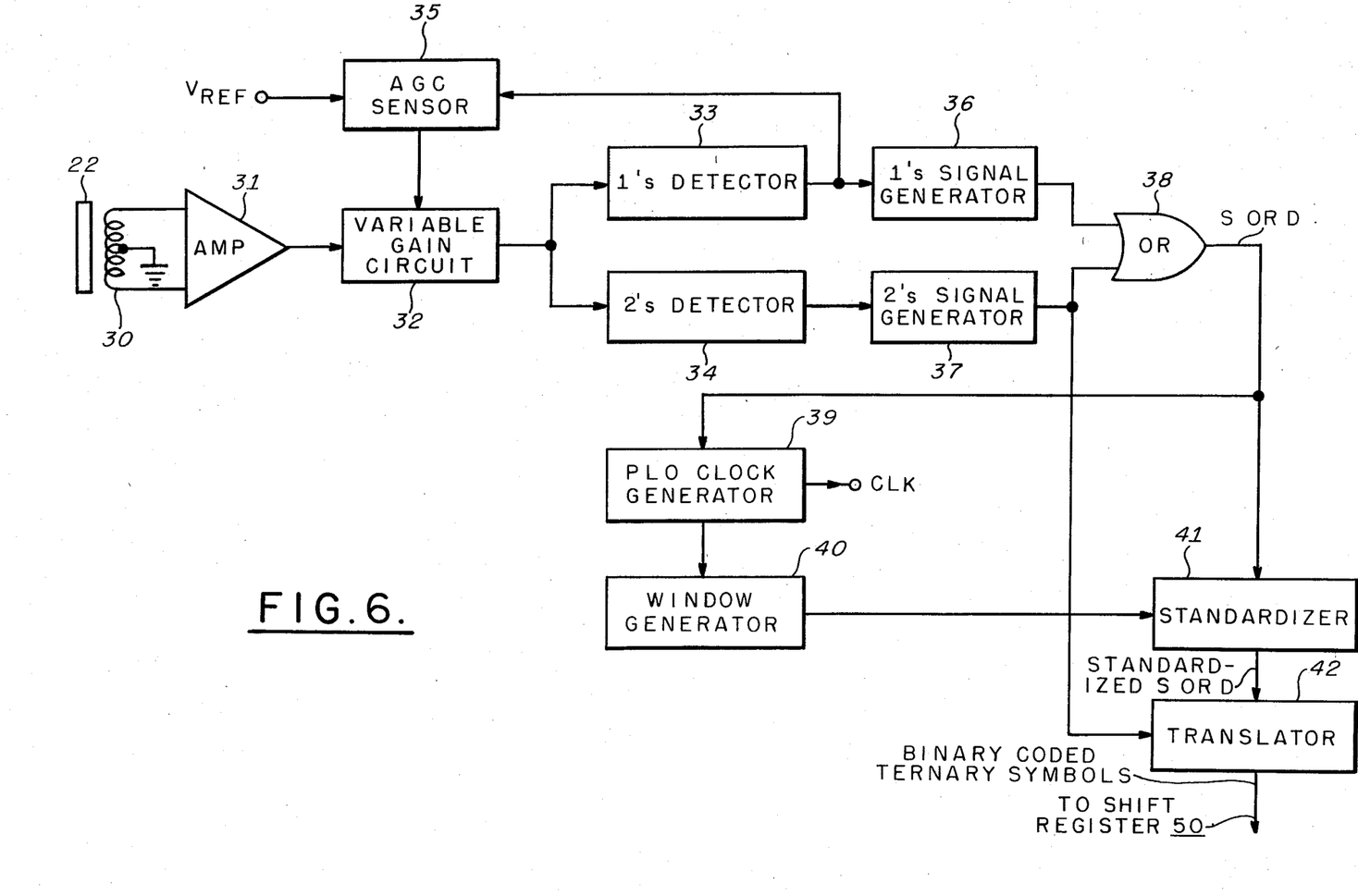
FIG. 6 is a schematic block diagram of electronic circuitry utilized in the reproducing portion of the system of the present invention.

Referring now to FIG. 6, electronic cicuitry utilized to convert the recorded signals into the corresponding ternary code is illustrated. A read head 30 adjacent the magnetic medium 22 reads the recorded singlets and doublets to provide the readback signals corresponding thereto as illustrated and discussed in said Ser. No. 260,248 as well as in said article by George V. Jacoby. The readback signal from the read head 30 is amplified in a read amplifier 31 and applied via a variable gain circuit 32 as inputs to a 1's detector 33 and a 2's detector 34. The 1's detector 33 is configured to detect the recorded singlets and the 2's detector 34 is configured to detect the recorded doublets. The detection criteria discussed in said Ser. No. 260,248 and in said Jacoby article may be utilized to provide the requisite 1's and 2's discrimination. In accordance with the invention, in order to provide a more robust detection discrimination between recorded 1's and 2's, the 1's detector 33 and the 2's detector 34 include sets of amplitude thresholds for utilizing the property that the amplitude of a detected doublet is greater than that of a null and the amplitude of a detected singlet is greater than that of a doublet to detect the recorded 1's and 2's.

The output of the 1's detector 33 provides the detected 1's readback signals to an AGC sensor circuit 35 which also receives a reference voltage $V_{ref}$. The AGC sensor circuit 35 compares the amplitudes of the detected 1's from the 1's detector 33 with the reference voltage and provides an error signal to the variable gain circuit 32 in accordance with the difference between the amplitude of the detected 1's and the reference voltage. The variable gain circuit 32 responds to the error signal from the AGC sensor circuit 35 to adjust the gain of the system so as to tend to reduce the error signal from the AGC sensor circuit 35 toward zero. Thus the AGC circuit comprising the elements 32 and 35 control the gain of the system in accordance with the amplitude of the 1's readback signal. In this manner, a reliable amplitude characteristic may be utilized to distinguish between recorded singlets, doublets and nulls. The voltage thresholds within the detectors 33 and 34 are set in accordance with the reference voltage $V_{ref}$ to provide the required amplitude discrimination between the recorded singlets, doublets and nulls.

The longest match herarchical encoding system discussed above permits all of the desirable constraints and properties of the prior ternary recording code to be retained as well as to incorporate the further constraint of limiting the runs between recorded singlets. As indicated, the code of the present invention limits the duration between recorded singlets to twenty-six detents. Thus, the AGC sensor 35 will always be provided with detected 1's so as to generate reliable AGC control. Additionally, as discussed above, the longest match hierarchical encoding system of the present invention permits the constraint of interrupting chained four detent 2's so that reliable polarity and phase discrimination between recorded 1's and 2's can be effected by the detectors 33 and 34.

Figure 9:
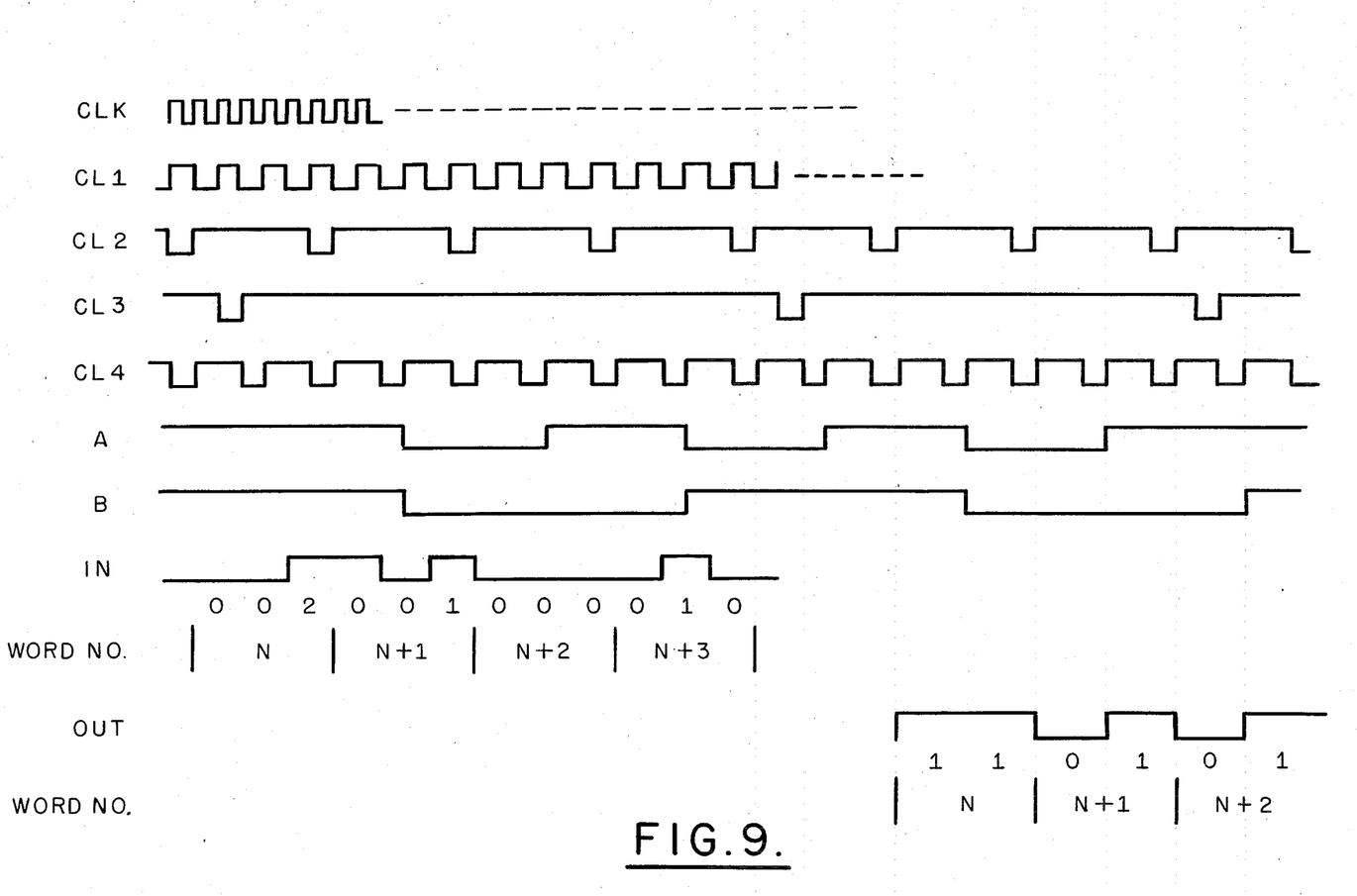
FIG. 9 is a waveform timing diagram illustrating waveforms related to the operation of the decoder of FIG. 7.

The output of the 1's detector 33 is applied as an input to a 1's signal generator 36 and the output of the 2's detector 34 is applied as an input to a 2's signal generator 37. The 1's signal generator 36 provides a logic pulse whenever the 1's detector 33 detects a singlet and the 2's signal generator 37 provides a logic pulse whenever the 2's detector 34 detects a doublet. The outputs of the 1's signal generator 36 and the 2's signal generator 37 are combined in an OR gate 38 to provide an S or D (singlet or doublet) pulse train. The S or D signal from the OR gate 38 is applied to a phase locked oscillator (PLO) clock generator 39 which provides the basic reproducing system clock CLK. The CLK clock is illustrated in FIG. 9. A clock signal from the clock generator 39 is applied to a window generator 40 for generating a window signal. Generation and utilization of window signals are well known in the art and are discussed in said Ser. No. 260,248, as well as in said article by George V. Jacoby.

The S or D pulses which are binary logic signals designating the presence of 1's and 2's and the window signal from the window generator 40 are applied to a standardizer 41. The standardizer 41 is a conventional circuit for centering the S and D pulses in appropriate windows. Standardizers are also discussed in said Ser. No. 260,248.

The standardized S or D signal is applied as an input to a translator 42 which also receives the output from the 2's signal generator 37. The translator is timed by the PLO clock generator 39 to provide the binary coded ternary output symbols corresponding to the recorded singlets, doublets and nulls. The translator 42 provides a ternary 1 in response to a pulse from the output of the 1's signal generator 36, two consecutive 1's designating a ternary 2 in response to an output from the 2's signal generator 37 and no signal when neither an S nor a D pulse is provided in the standardized S or D pulse train. The translator 42 provides the ternary 1 symbol when the standardized S or D pulse train provides a pulse and the 2's signal generator 37 does not provide a pulse and provides the ternary 2 symbol when the standardized S or D signal provides a pulse and the 2's signal generator 37 also provides a pulse. The translator 42 provides ternary 0 in the absence of a pulse in the standardized S or D pulse train.

Thus it is appreciated that the output of the translator 42 is the serial ternary code recovered from that generated and recorded by the apparatus of FIG. 3.

Figure 7:
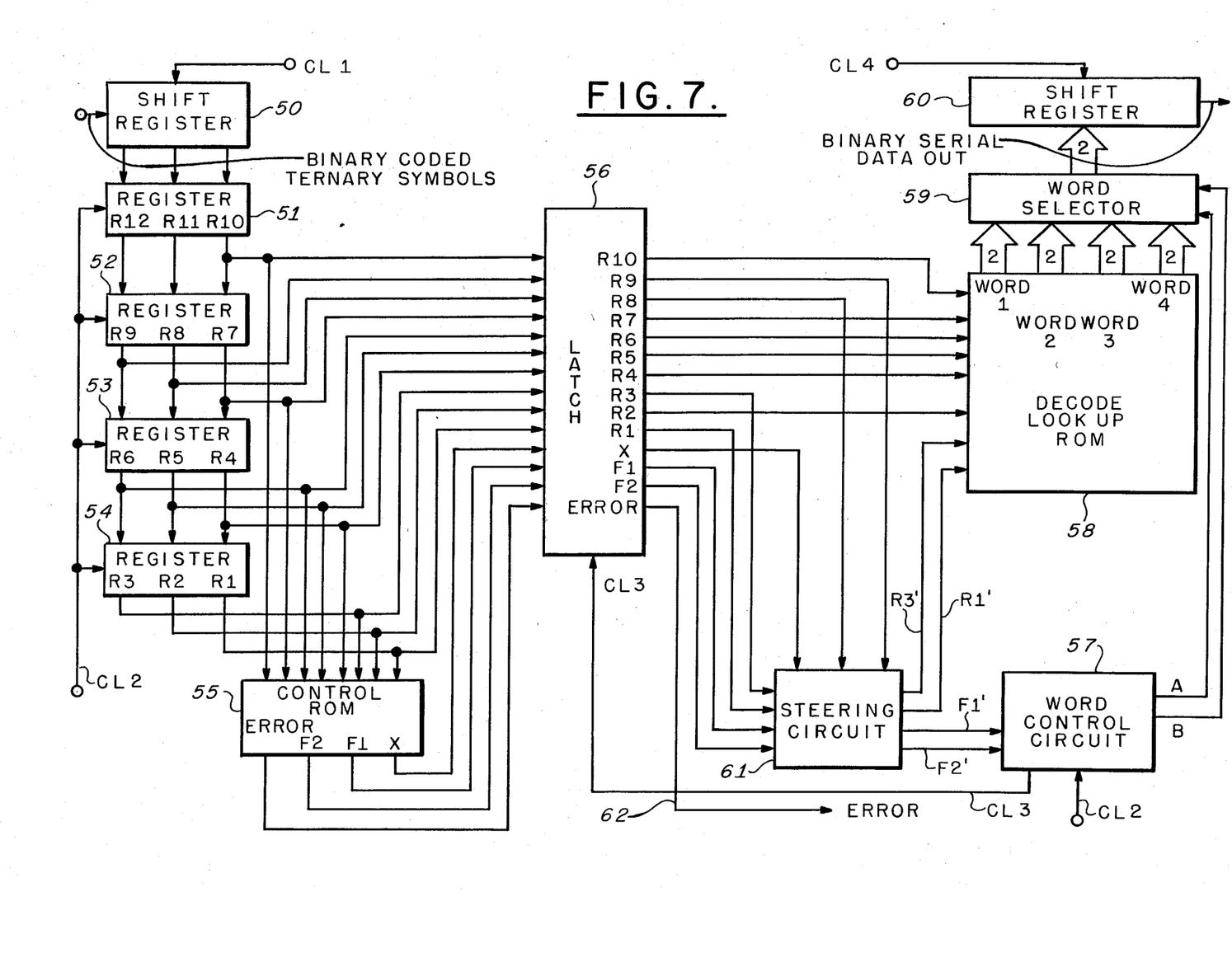
FIG. 7 is a schematic block diagram of the decoder utilized in the reproducing portion of the system of the present invention.

Referring now to FIGS. 4, 7 and 9, FIG. 7 illustrates the decoder of the present invention; FIG. 9 illustrates timing clock waveforms utilized in the decoder of FIG. 7 and FIG. 4, which was previously discussed, illustrates the flag table that is utilized both in the encoder and decoder. The decoder of FIG. 7 is timed by the CLK clock provided by the PLO clock generator 39 of FIG. 6.

Referring to FIG. 7, the serial binary coded digits of the ternary symbols provided by the translator 42 of FIG. 6 are applied as an input to a three stage serial-in-parallel-out shift register 50 that shifts the ternary code digits to the right in response to the ternary digit clock signal CL1. It is appreciated that while CL1 of the encoder of FIG. 3 is CLK/3, CL1 of the decoder of FIG. 7 is CLK/2 since two binary bits are encoded into three ternary digits. The ternary digit clock CL1 of FIG. 7 is illustrated in FIG. 9. The shift register 50 converts the serial stream of ternary code digits into parallel code words of three digits each. The parallel output of the shift register 50 is applied to a three stage parallel-in parallel-out register 51 clocked by the ternary code word clock CL2 which is illustrated in FIG. 9. CL2 is at ⅓ the frequency of CL1. The parallel output of the register 51 is coupled to the parallel input of a further three stage parallel-in parallel-out register 52, the output of which is coupled as the input to a third parallel-in parallel-out register 53 which is further coupled to a fourth parallel-in parallel-out register 54. All of the registers 51–54 are strobed by the ternary code word clock CL2. It is appreciated that the registers 50–54 may be commercially procurable multipurpose registers controlled to provide the functions described or alternatively the registers 51–54 may be three stage latches or buffers. The CL1 ternary digit clock continuously shifts the ternary code digits through the register 50 while the ternary code word clock CL2 propagates successive three digit ternary code words through the sequence of registers 51–54. It is thus appreciated that the outputs of the registers 51–54 provide the twelve most recent ternary code digits which comprise the four most recent three digit ternary code words. The outputs of the registers 51–54 are denoted as R1–R12 corresponding to the digits of the righthand side of the code table of FIG. 2.

Although the twelve most recent ternary code digits are available during an iteration, only eight of these digits are, for convenience, utilized in addressing the control and code conversion circuitry of the decoder of FIG. 7. The eight digits utilized are R1–R7 and R10. The binary patterns for R1–R12 with respect to single word, double word, triple word and quadruple word groups are delineated in the righthand side of the code table of FIG. 2. As previously described, the code table of FIG. 1 and the code table of FIG. 2 contain the same information where the various code combinations are denoted by item numbers 1–19. For convenience, the eight digits R1–R7 and R10 may be considered as a two digit hexadecimal address where R1–R4 translate into the first digit of the hexadecimal address and R5, R6, R7 and R10 translate into the second digit of the hexadecimal address. The hexadecimal addresses are illustrated in FIG. 1.

It is appreciated with reference to FIG. 1 that each single word, double word, and triple word code group is unambiguously associated with a group of hexadecimal addresses whereas each quadruple word code group is associated with a single hexadecimal address. It is further observed that the hexadecimal address for each quadruple word group is the same as one of the double word group addresses or one of the triple word group addresses. Specifically, the quadruple word groups 14, 15, and 16 have addresses that are the same as triple word groups 12, 13 and 11, respectively, and quadruple word groups 17, 18 and 19 have the same hexadecimal addresses as double word groups 6, 9 and 7, respectively. This addressing ambiguity is resolved in a manner to be explained.

To further clarify the hexadecimal addressing technique illustrated in FIG. 1, several examples are now given. If the hexadecimal address designated by the eight digits R1–R7 and R10 comprises hexadecimal addresses 60, 61, 62 or 63, double word group 8 is uniquely designated. If, however, any other hexadecimal address having the first digit 6 is designated, then that address uniquely designates the single word 4. The single word 4 may also be uniquely designated by a hexadecimal address having the first digit of 7. As a further example, hexadecimal addresses 20, 22, and 23 uniquely designate the double word group 6 whereas hexadecimal address 25 uniquely designates triple word group 11 and hexadecimal address 27 uniquely identifies triple word group 13. If the eight addressing digits are hexadecimal address 21, the code group may either be the quadruple word group 17 or the double word group 6. If the hexadecimal address is 24, the code group may either by quadruple word group 16 or triple word group 11. Similarly, if the hexadecimal address is 26, the code group may either by quadruple word group 15 or triple word group 13. Any other hexadecimal address wherein the first digit is 2 will designate an invalid code group indicating that an error has occurred.

Referring still to FIG. 7, parallel outputs R1–R7 and R10 from the registers 51–54 are applied as an eight bit input to a control circuit 55 which is preferably embodied as a control ROM utilizing the eight bit input as the addressing signal therefor. The control ROM 55 is a 256 word memory four bits wide. Two of the four bits of the ROM 55 word length are utilized as flag signals F2 and F1 to determine whether the current twelve ternary code digits represent a single word, a double word group, a triple word group, or a quadruple word group. The flag signals F2 and F1 are delineated in FIG. 4. When the hexadecimal address into the control ROM 55 represents one of the ambiguous conditions discussed above, the flags are set as appropriate for the double word group, or the triple word group. If, in fact, the code word represents a quadruple word group, circuitry to be later described will provide the flag signals appropriate for the quadruple word group.

A third bit of each of the four bit words stored in the ROM 55 is designated as "X" and is utilized in resolving the ambiguity between quadruple words and double and triple words. If the hexadecimal address is such that the ambiguity is between a quadruple word group and a double word group (designated as a type 1 quadruple word group), then the X bit is set to 0 in the words of control ROM 55 that are addressed by the hexadecimal addresses associated with the type 1 quadruple word. If the ambiguity is between a quadruple word group and a triple word group (designated as a type 2 quadruple word group), then the X bit in those control words in the ROM 55 are set to 1. For all other groups where there is no ambiguity, the X bit is also set to 1. Thus, when the eight addressing digits form one of the hexadecimal addresses, which may represent a quadruple word group, the X bit is set in the addressed control words in the ROM 55 so that the ambiguity may be resolved.

The fourth bit of the control words in the ROM 55 is reserved for an error indication wherein the error bit of those words addressed by any of the hexadecimal addresses delineated in FIG. 1 are set to 0 with the error bit of the remaining words in the ROM 55 being set to 1 to produce an error flag when an invalid group is detected.

Ten of the current twelve ternary code digits from the registers 51–54, as well as the four bits from the control ROM 55, are applied as inputs to a latch 56. The addressing code digits R1 through R7 and R10 are applied to the latch 56 as well as the code digits R8 and R9 which are utilized in resolving the ambiguities of the type 1 and type 2 quadruple word groups described above. The control ROM 55 provides the flag signals F2 and F1, the X bit and the error bit to the latch 56. The latch 56 is strobed by a clock CL3 from a word control circuit 57. The CL3 clock signal is illustrated in FIG. 9. The latch 56 provides the ten ternary code digits R1–R10 as well as the control digits X, F1, F2 and error stored therein at its output until strobed by the CL3 clock at which time the data stored in the latch 56 is replaced by the new data extent at the input of the latch.

The decoder of FIG. 7 also includes an eight bit addressable ROM 58 which stores 256 eight bit words. The ROM ROM 58 is utilized for converting the ternary code digits on the righthand side of the code table of FIG. 2 into the corresponding binary data bits on the lefthand side of the code table. The eight bit output from the ROM 58 is applied via a word selector 59 to a two stage parallel-in serial-out shift register 60. The word selector 59 is controlled by word control signals A and B from the word control circuit 57. The shift register 60 provides the recovered binary serial output data. The structure and operation of the word control circuit 57, the ROM 58, the word selector 59 and the shift register 60 are similar to the corresponding components 17, 18, 19 and 20 of the encoder of FIG. 3. Further details of these elements of the decoder of FIG. 7 will be later provided.

As discussed above, when the current hexadecimal address designates one of the ambiguous situations between quadruple word groups and double or triple word groups, the flags F2 and F1 are provided by the control ROM 55 in accordance with the appropriate indication for a double word or a triple word group. At the locations in the decode lookup ROM 58, addressable by these ambiguous addresses, the appropriate double or triple word binary string is stored. For example, hexadecimal address 31 designates either quadruple word group 18 or double word group 9. The location in the ROM 58 addressable by hexadecimal address 31 will store the binary data pattern of line 9 on the lefthand side of the code table of FIG. 2. It is observed from the code pattern of FIG. 2 that with respect to an ambiguity between a double word group and a quadruple word group, a type one quadruple word group exists when R8=0 and R9=0. Otherwise, the digits R1–R6 are decoded as a double word group. With respect to the ambiguity between a triple word group and quadruple word, a type 2 quadruple word group exists when R8=0 and R9=1 otherwise R1–R9 is decoded as a triple word group.

When the current ternary code group comprises a quadruple word group, a steering circuit 61 is included in the decoder of FIG. 7 for altering the hexadecimal address to an address in the ROM 58 not previously used at which to store the corresponding binary bits and for altering the flag signals F2 and F1 by setting both flags to logic 1 indicating a quadruple word group. The steering circuit 61 is coupled to the latch 56 for receiving the F2 and F1 flag signals, the X control bit, the R8 and R9 ternary digits for resolving the ambiguities and the R1 and R3 address bits for alteration to unused addresses whereat to store the binary bits corresponding to the quadruple word group. The steering circuit 61 provides altered addressing digits R1' and R3' to the ROM 58 as well as altered flag signals F2' and F1' to the word control circuit 57. When the current ternary code group is a quadruple word group, the steering circuit 61 effects the following hexadecimal address alterations 34 to 14, 26 to 06, 24 to 04, 21 to A1, 31 to B1 and 41 to E1.

Figure 8:
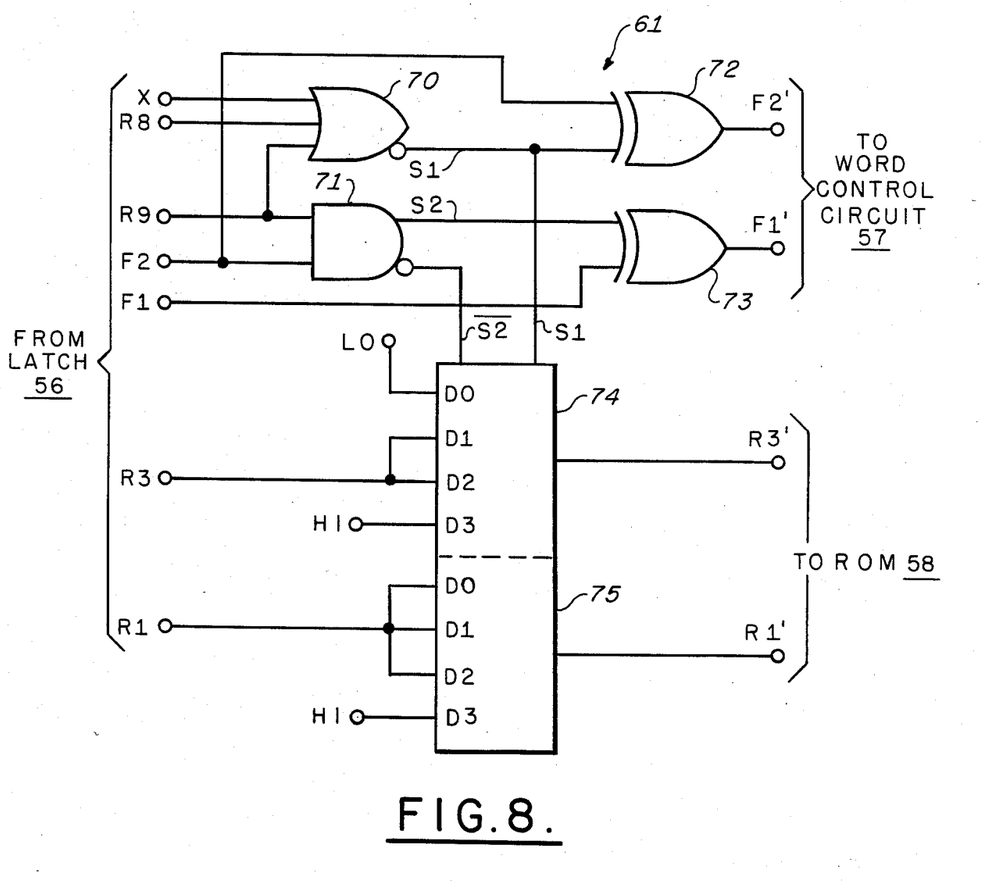
FIG. 8 is a schematic logic diagram of the steering circuit of the decoder of FIG. 7.

Referring now to FIG. 8, details of the steering circuit 61 are illustrated. The steering circuit 61 utilizes two control signals S1 and S2 developed in accordance with the following Boolean equations.

$$S2 = R9 \cdot F2$$

$$S1 = (R9 + R8 + X)$$

A NOR gate 70 coupled to receive the signals R8, R9 and X develops the S1 control signals while an AND gate 71 coupled to receive the R9 and F2 signals develops the S2 control signal. An exclusive OR gate 72 coupled to receive the F2 flag signal and the S1 control signal transmits F2 unchanged when S1=0 and complements F2 when S1=1. In a similar manner, an exclusive OR gate 73 coupled to receive the flag signal F1 and the control signal S2 transmits the flag signal F1 unaltered when S2=0 and complements the F1 signal when S2=1. The exclusive OR gates 72 and 73 provide the F2' and F1' flag signals, respectively, to the word control circuit 57. Selector switches 74 and 75 modify the addressing digits R1 and R3 in response to the control signals S2 and S1 and provide the altered address digits R3' and R1', respectively, to the ROM 58.

In the operation of the steering circuit 61 of FIG. 8, F2=1 only when a triple word group or type 2 quadruple word group is indicated and in that situation R9=0 for a triple word group and R9=1 for a quadruple word resulting in S2=1 as an unambiguous indication of a type 2 quadruple word group. Similarly, X=0 only for a double word group or a suspected type one quadruple word group. Therefore, S1=1 is an unambiguous indication of a type one quadruple word group. Under the conditions, when a quadruple word group is confirmed by S1=1 or S2=1, the appropriate exclusive OR gate 72 or 73 will complement one of the flags F2 or F1 so as to provide the quadruple word group indication. When the quadruple word is detected, the selector switches 74 and 75 modify the ROM address bits R3 and R1 providing the modified address bits R3' and R1'. When a quadruple word group is not indicated, S1 and S2 will be 0 transmitting the flag signals F2 and F1 unaltered as well as transmitting the address digits R3 and R1 unaltered.

Referring again to FIG. 7, the F2' and F1' signals from the steering circuit 61 are applied to the word control circuit 57 which is also responsive to the ternary code word clock CL2. In a manner similar to that described above with respect to the word control circuit 17 of FIG. 3, the word control circuit 57 includes a word counter (not shown) which comprises a two stage binary counter coupled to count the code word clock pulses CL2. The two bit parallel binary output of the word counter is provided as the word selector signals A and B. The word control circuit 57 also includes a two bit comparator (not shown) that compares the output of the word counter with the flag signals F2' and F1' and provides the CL3 clock when the output of the word counter matches the flag signals. Thus, it is appreciated that the word control circuit 57 provides the CL3 clock signal whenever the word counter contained therein has counted the occurrence of one, two, three or four ternary code words in accordance with the word count instruction provided by the F2' and F1' signals from the steering circuit 61. The word selector control signals A and B from the word control circuit 57 are illustrated in FIG. 9.

The addressing bits R2, R4–R7 and R10 from the latch 56 as well as addressing bits R1' and R3' from the steering circuit 61 provide the eight bit address into the decode lookup ROM 58 which in response thereto outputs the binary sequence on the lefthand side of FIG. 2 corresponding to the current single, double, triple or quadruple ternary code groups from the righthand side of FIG. 2. The output of the ROM 58 is denoted as word 1, word 2, word 3 and word 4 corresponding to the two bit binary words decoded from the three digit ternary code words.

The eight bit output of the ROM 58 is applied to the word selector switch 59 which receives the word selector control signals A and B from the word control circuit 57. The word selector switch 59 sequentially provides the words 1, 2, 3 and 4 from the ROM 58 to the two bit output of the word selector switch 59 in response to the word selector control signals A and B. Thus, the word selector 59 provides a variable number of two bit binary data words in accordance with the instruction provided by the flag signals F1' and F2'.

The two bit output of the word selector 59 is applied as the parallel input to a parallel-in serial-out shift register 60 which is clocked by a binary bit clock CL4. the binary bit clock CL4 is illustrated in FIG. 9. The output of the shift register 60 provides the recovered binary serial data corresponding to the encoded ternary signals recorded on the medium 22. The CL4 clock has a frequency CLK/3 thus permitting the shift register 60 to transmit two binary data bits in the same time that the input shift register 50 receives three ternary code digits.

In operation, the word counter within the word control circuit 57 counts the ternary code word clock pulses CL2 and provides sequential control signals A and B which control the word selector 59 to sequentially provide the two bit binary words from the output of the ROM 58. The flag signals F2' and F1' indicate whether one, two, three or four three digit code words are to be decoded. When the output of the word counter (which provides the signals A and B) attains the value of the flags F2' and F1', the comparator within the word control circuit 57 issues the CL3 signal which strobes the current ten ternary digits R1–R10 into the latch 56 and recycles the word selector 59 back to word 1. Thus, it is appreciated when the decoding of a variable length group of code words is completed, the word control circuit 57 issues the CL3 signal to strobe the most recent code words as well as the corresponding flag and ambiguity resolving signals into the latch 56. In this manner, the recovered ternary code words are decoded in accordance with the variable length code of the present invention as illustrated in FIGS. 1 and 2 to recover the input binary data in accordance with the longest match to the code words on the righthand side of FIG. 2.

When the ternary code group comprises an invalid pattern (not in the code table), the control ROM 55 provides the error signal via the latch 56 to an output lead 62. The decode lookup ROM 58 may be programmed to provide an all-zero data word for the invalid code. A "best guess" data word may also be programmed into the ROM 58 for invalid code words.

Thus, it is appreciated from the foregoing that although the novel longest match variable length code structure slightly complicates the encoding and decoding circuits, the invention makes it possible to impose complex restrictions on the code. The restrictions discussed above improve the capability of the detection circuits while actually making these detection circuits, which are the most critical parts of the READ/WRITE channel, simpler in design.

The above-described embodiment of the invention simultaneously searches the code table for the longest match. It is appreciated that the invention may also be practiced by searching the code table first for the quadruple words and then if none are found for the triple words and so forth or even forward through the code table from single words to quadruple words until the longest match is encountered. The present invention was described in terms of utilization in a ternary system. It is appreciated that the longest match variable length code structure of the invention may be utilized in a binary system or in a system of any other radix. Although the specific code illustrated in FIGS. 1 and 2 is preferred, any isomorphism of this code may be utilized in practicing the invention. Additionally, although the ternary embodiment of the invention was described in terms of singlets, doublets and nulls as the recording waveform, other ternary signal change waveforms may also be utilized in practicing the invention.

The present invention was described in terms of a logic span of twelve code digits utilizing single, double, triple and quadruple word groups. Quintuple words and even higher order groups may also be utilized within the context of the present invention for effecting even further constraints than those described herein. The present invention was explained in terms of a maximum of twenty-six detents between singlets. It is appreciated that the code may be structured to effect longer or shorter spans with the AGC circuitry designed accordingly.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Apparatus for encoding binary data into corresponding code signals comprising
    data storage means for receiving input binary data and forming said input binary data into a plurality of input data bits,
    code generating means responsive to said plurality of input data bits for storing a plurality of variable length code symbol groupings corresponding to variable lengths of binary data bit groupings,
    at least two of said binary data bit groupings matching the same plurality of input data bits,
    each plurality of input data bits being matched by at least one of said binary data bit groupings,
    said code generating means providing the code symbol grouping corresponding to the longest match between said binary data bit groupings and said plurality of input data bits, and translating means responsive to said code generating means for translating said code symbol grouping corresponding to said longest match into corresponding code signals.

2. The apparatus of claim 1 in which said code generating means includes memory means for storing said plurality of variable length code symbol groupings addressable by said binary data bit groupings.

3. The apparatus of claim 1 further including control means responsive to said plurality of input data bits for providing a word control signal representative of the length of said longest match.

4. The apparatus of claim 2 further including control means responsive to said plurality of input data bits for providing a word control signal representative of the length of said longest match.

5. The apparatus of claim 4 in which
said memory means has an output at least as long as the longest length of said variable length code symbol groupings, and
said code generating means includes selector means responsive to the output of said memory means and responsive to said word control signal for providing a selected portion of said output of said memory means in accordance with said word control signal thereby providing said code symbol grouping corresponding to said longest match.

6. The apparatus of claim 4 in which
said plurality of input data bits comprises N words of K data bits each,
said variable length code symbol groupings comprise up to N words of J code symbols each, and
said binary data bit groupings comprise up to N words of K data bits each,
the output of said memory means comprises N words of J code symbols each, and
said word control signal represents the number of words comprising said longest match.

7. The apparatus of claim 6 in which said code generating means further includes
word selector means responsive to the output of said memory means and to said word control signal for sequentially providing said words comprising said code symbol grouping corresponding to said longest match until the number of words provided corresponds to the number of words represented by said word control signal, and
parallel-to-serial converter means responsive to the sequentially provided words from said word selector means for serially providing the code symbols comprising each word.

8. The apparatus of claim 6 in which said data storage means includes means coupled to said control means for discarding the number of words from said plurality of input data bits corresponding to the number of words represented by said word control signal and replacing these words with new input binary data words.

9. The apparatus of claim 8 in which said data storage means comprises
serial-to-parallel converter means having K stages responsive to said input binary data for forming said K bit input binary data words,
N parallel-in parallel-out registers each comprising K stages, the parallel output of said serial-to-parallel converter means coupled to the parallel inputs of one said register with the outputs of said registers coupled to inputs of succeeding registers, whereby said K bit input data words are propagated through said registers, the outputs of said parallel-in parallel-out registers providing said plurality of input data bits, and
latch means coupled between the parallel outputs of said parallel-in parallel-out registers and the addressing input of said memory means and coupled to said control means for storing the outputs from said parallel-in parallel-out register means until a number of input binary words have been propagated through said register means equal to the number of words represented by said word control signal and then strobing therein in response to said control means the extant output from said parallel-in parallel-out reigsters.

10. The apparatus of claim 9 in which said control means includes a control memory addressable by the outputs of said parallel-in parallel-out registers for providing said word control signal.

11. The apparatus of claim 2 for encoding said binary data into corresponding ternary code signals in which
said plurality of variable length code symbol groupings comprise a plurality of variable length ternary code symbol groupings, and
said translating means comprises means for translating said ternary code symbol grouping corresponding to said longest match into corresponding ternary code signals.

12. The apparatus of claim 11 wherein said ternary code symbols comprise a ternary 0 code symbol, a ternary 1 code symbol and a ternary 2 code symbol wherein the ternary code signal corresponding to said ternary 0 code symbol is represented by an absence of a signal change, the ternary code signal corresponding to said ternary 1 code symbol is represented by a first kind of signal change and the ternary code signal corresponding to said ternary 2 code symbol is represented by a second kind of signal change.

13. The apparatus of claim 12 in which said plurality of variable length ternary code symbol groupings comprises a ternary code for encoding said binary data into said corresponding ternary code signals so that spacings between ternary 1 code symbols are limited to a finite value and so that chained ternary 2 code symbols have irregular spacings therebetween for all patterns of said input binary data.

14. The apparatus of claim 12 in which said memory means comprises memory means for storing the code table of FIG. 2 where the lefthand side of said code table comprises said binary data bit groupings, said righthand side of said code table comprises said variable length ternary code symbol groupings and where two consecutive 1's on said righthand side of said code table comprise said ternary 2 code symbol at the location of the left most one of said two consecutive 1's.

15. The apparatus of claim 14 in which said translating means provides said first kind of signal change in response to each 1 on the righthand side of said code table, two consecutive first kind of signal changes resulting from the double 1's on said righthand side of said code table comprising said second kind of signal change representative of said ternary 2 code symbol.

16. The apparatus of claim 15 comprising apparatus for use in a magnetic storage system for recording said signal changes on a magnetic medium wherein said first kind of signal change, corresponding to said ternary 1 code symbol comprises a single transition between one magnetic saturation polarity and the other magnetic saturation polarity and said second kind of signal change representative of said ternary 2 code symbol, comprises a pair of adjacent and closely spaced transitions between magnetic saturation polarities.

17. The apparatus of claim 16 in which said magnetic storage system further includes a data recovery system for recovering the input binary data corresponding to said single transitions and pairs of transitions recorded on said medium.

18. The apparatus of claim 17 in which said data recovery system comprises
   read transducer means for reading said single transitions and said pairs of transitions from said magnetic medium thereby providing a readback signal,
   first detector means for detecting said single transitions in said readback signal,
   second detector means for detecting said pairs of transitions in said readback signal, and
   automatic gain control means coupled to said first detector means for stabilizing the gain of said recovery system in accordance with the amplitudes of the single transitions detected by said first detector means.

19. The apparatus of claim 18 in which said automatic gain control means comprises
   automatic gain control sensor means coupled to said first detector means for providing a signal proportional to the difference between the amplitudes of the single transition readback signals and a reference signal, and
   variable gain means interposed between said read transducer means and said first and second detector means and responsive to said difference signal from said automatic gain control sensor means for adjusting the gain of said data recovery system so that said difference signal tends toward zero.

20. The apparatus of claim 18 in which said data recovery system includes translator means responsive to said first and second detector means for providing a recovered ternary 1 code symbol in response to detecting a single transition in said readback waveform, a recovered ternary 2 code symbol in response to detecting a pair of transitions in said readback waveform and a ternary 0 code symbol in response to the absence of a transition in said readback waveform, thereby providing recovered ternary code symbols.

21. The apparatus of claim 20 in which said data recovery system further includes decoder apparatus responsive to said recovered ternary code symbols for providing the variable length binary data bit groupings corresponding thereto.

22. The apparatus of claim 21 in which said decoding apparatus comprises
   decoder data storage means for receiving said recovered ternary code symbols and forming said recovered ternary code symbols into a plurality thereof, and
   decode generating means responsive to said plurality of recovered ternary code symbols for storing a plurality of variable length binary data groupings corresponding to variable lengths of ternary code symbol groupings and providing the binary data grouping corresponding to said plurality of recovered ternary code symbols.

23. The apparatus of claim 22 in which said decode generating means includes decode memory means for storing said plurality of variable length binary data groupings addressable by said ternary code symbol groupings.

24. The apparatus of claim 23 in which
   said plurality of recovered ternary code symbols comprise N words of J ternary code symbols each,
   said variable length binary data groupings comprise up to N words of K data bits each,
   said variable lengths of ternary code symbol groupings comprise up to N words of J ternary code symbols each, and
   the output of said decode memory means comprises N words of K data bits each.

25. The apparatus of claim 24 further including decoder control means responsive to said plurality of recovered ternary code symbols for providing a word control signal representative of the number of valid words contained in said plurality of recovered ternary code symbols.

26. The apparatus of claim 25 in which said decode generating means further includes
   word selector means responsive to the output of said decode memory means and to said word control signal for sequentially providing said words comprising said binary data grouping corresponding to said plurality of recovered ternary code symbols until the number of words provided corresponds to the number of words represented by said word control signal, and
   parallel-to-serial converter means responsive to the sequentially provided words from said word selector means for serially providing the binary data bits comprising each word.

27. The apparatus of claim 24 in which said decoder data storage means includes means coupled to said decoder control means for discarding the number of words from said plurality of recovered ternary code symbols corresponding to the number of words represented by said word control signal and replacing these words with new recovered ternary code words.

28. The apparatus of claim 27 in which said decoder data storage means comprises
   serial-to-parallel converter means having J stages responsive to said recovered ternary code symbols for forming said words of J ternary code symbols,
   N parallel-in parallel-out registers each comprising J stages, the parallel output of said serial-to-parallel converter means coupled to the parallel input of one said register with the outputs of said registers coupled to inputs of succeeding registers, whereby said J symbol code words are propagated through said registers, the outputs of said parallel-in parallel-out registers providing said plurality of recovered ternary code symbols, and
   latch means coupled between the parallel outputs of said parallel-in parallel-out registers and the addressing input of said decode memory means and coupled to said decoder control means for storing the outputs from said parallel-in parallel-out register means until a number of ternary code words have been propagated through said register means equal to the number of words represented by said word control signal and then strobing therein in response to said control means, the extant output from said parallel-in parallel-out registers.

29. The apparatus of claim 28 in which said decoder control means includes a decoder control memory addressable by the outputs of said parallel-in parallel-out registers for providing said word control signal.

30. The apparatus of claim 23 in which said decode memory means comprises decode memory means for storing the code table of FIG. 2 where the righthand side of said code table comprises said ternary code symbol groupings and said lefthand side of said code table comprises said variable length binary data groupings.

31. The apparatus of claim 30 in which said decode memory means comprises decode memory means addressed by less than N x J of said plurality of recovered ternary code symbols resulting in ambiguities in addressing said plurality of variable length binary data groupings.

32. The apparatus of claim 31 in which said decoder apparatus further includes ambiguity resolving means responsive to ternary code symbols not utilized in addressing said decode memory means for altering the address into said decode memory means and for altering the number of words represented by said word control signal.

33. The apparatus of claim 32 in which said control memory means further provides an ambiguity resolving signal in response to said ternary code symbols utilized to address said decode memory means.

34. The apparatus of claim 33 in which said ambiguity resolving means comprises means further responsive to said ambiguity resolving signal for altering said decode memory means address and said word control signal.

35. The apparatus of claim 33 in which said control memory means further provides an error signal in response to said plurality of recovered ternary code symbols not containing any ternary symbol code word grouping on said righthand side of said FIG. 2.

36. A method for encoding binary data into corresponding ternary code signals comprising
receiving input binary data,
forming said input binary data into a plurality of input data bits,
storing a plurality of variable length ternary code symbol groupings corresponding to variable lengths of bindary data groupings,
at least two of said binary data bit groupings matching the same plurality of input data bits,
each plurality of input data bits being matched by at least one of said binary data bit groupings,
providing the code symbol grouping corresponding to the longest match between said binary data bit groupings and said plurality of input data bits, and
translating said ternary code symbol grouping corresponding to said longest match into corresponding code signals.

37. The method of claim 36 in which said step of storing comprises the step of storing the code table of FIG. 2 where the lefthand side of said code table comprises said binary data bit groupings, said righthand side of said code table comprises said variable length ternary code symbol groupings and whereon said righthand side of said code table 0 represents one ternary code symbol, an isolated binary 1 represents a second ternary code symbol and two consecutive binary 1's represent a third ternary code symbol.

* * * * *